United States Patent Office 3,249,625
Patented May 3, 1966

3,249,625
PROCESS FOR PREPARING N-VINYL PYRROLIDONE-2
Herbert Bestian, Frankfurt am Main, and Robert Hartwimmer, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Sept. 18, 1962, Ser. No. 224,562
Claims priority, application Germany, Sept. 21, 1961, F 34,961
10 Claims. (Cl. 260—326.5)

The present invention relates to the vinylation of acid amides.

In industry various processes are used for the manufacture of N-vinyl carboxylic acid amides and N-vinyl lactams. The most important method is the direct addition of acetylene on the corresponding amides and lactams, the so-called vinylation. The said vinylation, which is carried out in the liquid phase in the presence of strongly alkaline substances as catalysts, requires the application of relatively high acetylene gas pressures, partially up to the permissible limits. Consequently, the construction and attendance of suitable plants is very expensive since it is necessary to use high grade material, for example special armatures, to install safety devices and to maintain a number of strongly specified safety precautions. For example, when operating with acetylene under pressure for the reason of safety the apparatus used must withstand a pressure which is 10 to 20 times higher than the pressure applied in the reaction of acetylene. Moreover, the processes under pressure are usually carried out in discontinuous manner, each exchange of charges requiring, as is known, considerable work and time. The high concentrations of substances occurring under the specified conditions favor in many cases an undesired oligomer formation, which, on account of troublesome resinifications, may lead to important substance losses and yield reductions.

It has now been found that N-vinyl carboxylic acid amides and N-vinyl lactams of the general formula $$R-CO-\underset{\underset{CH=CH_2}{|}}{N}$$

in which R and R' represent identical or different, if desired substituted, hydrocarbon radicals or heterocyclic radicals, and in which R and R' may be linked with one another to form a lactam ring, can be prepared by reacting at elevated temperatures a carboxylic acid amide or a lactam of the general formula.

$$R-CO-\underset{\underset{H}{|}}{N}R'$$

in which R and R' have the meaning given above, with acetylene in the gaseous phase in the presence of alkali metal metallates or mixed oxides of alkali metal oxides and amphoteric metal oxides. When operating in this manner, the reaction can be carried out in a simple contact furnace commonly used for gas-catalytic reactions, instead of in a pressure apparatus having the aforesaid disadvantages. Gas-catalytic processes require only little attendance and nowadays they are mostly carried out in automatic apparatus. Still further, all safety precautions necessary in the processing with compressed and explosive gases can be dispensed with. The catalysts used are inexpensive to manufacture and have a long lifetime.

The process of the invention is suitably carried out as follows:

Gaseous acetylene and the acid amide or lactam which is not in the gaseous state are conducted to an evaporator in which the acid amide or the lactam is evaporated and the acetylene is preheated. The preheated gaseous or vaporous reaction mixture is then reacted in a contact zone which contains the catalyst and has been heated to the reaction temperature, the residence time of the reaction mixture in the contact zone being preferably 10 to 50 seconds. The reaction mixture leaving the reaction zone is condensed and separated, suitably by distillation. The unreacted portions of the starting materials are continuously reconducted to the evaporator together with fresh acetylene and acid amide.

The acid amides used must be vaporizable at the reaction temperature. They have the general formula

in which R and R' represent identical or different aliphatic, cycloaliphatic, araliphatic, hydroaromatic, aromatic or heterocyclic radicals. The acyclic radicals may have a straight or branched chain and the cyclic radicals may carry side chains. Moreover, the radicals may carry functional groups, provided that they are inert under the reaction conditions and do not impair the reactivity of the N—H linkage, for example chlorine or fluorine atoms. Finally, R and R' may be linked with one another forming a ring, the ring compounds belonging to the class of lactams.

As open-chain carboxylic acid amides there can be used the amides of aliphatic, cycloaliphatic, araliphatic and aromatic carboxylic acids. When amides of aliphatic carboxylic acids are used R stands for hydrogen or an aliphatic, straight-chain or branched radical preferably having 1 to 20 carbon atoms. In the case of amides of cycloaliphatic carboxylic acids R is preferably mononuclear and can represent for example the cyclohexyl radical or a cyclohexyl radical substituted by low alkyl groups. When amides of araliphatic carboxylic acids are used R stands, for example, for the benzyl radical and in amides of aromatic carboxylic acids R is preferably a mononuclear radical, for example the phenyl, tolyl or xylyl radical.

In open-chain carboxylic acid amides R' stands for a radical which is identical with the alkyl, cycloalkyl, aralkyl or aryl radicals mentioned for R. The radicals R and R' may be similar or different.

Suitable open-chain carboxylic acid amides are N-methyl-formamide, N-methyl-acetamide, N-ethyl-acetamide, N-propyl-acetamide, N-isopropyl-acetamide, N-butylacetamide, N-dodecyl-acetamide, N-cyclohexyl-acetamide, N-benzyl-acetamide, acetic acid anilide, acetic acid toluidide, N-methyl-propionamide, N-ethyl-propionamide, N-propyl-propionamide, propionic acid anilide, N-ethyl-butyramide, N-methyl-isobutyramide, N-methyl-trimethyl-acetamide, N-butyl-caproic acid amide, N-methyl lauric acid amide, N-methyl-stearic acid amide, N-methyl-fluoroacetamide, N-methyl-cyclohexane-carboxylic acid amide, N-methyl-benzamide, N-ethyl-benzamide, or benzoic acid anilide.

As cyclic carboxylic acid amides(lactams) in which the radicals R and R' are linked with one another to form a ring there can be used lactams having different numbers of ring members, especially those of 5 to 7 ring members, for example γ-, δ,- and ε-lactams as well as lactams having still more ring members. There are mentioned by way of example pyrrolidone-2, piperidone-2, ε-caprolactam, capryl lactam, luryl lactam and derivatives of these compounds carrying substituents on the carbon atom, such as 5,5-dimethylpiperidone-2.

The acid amides and lactams to be vinylated are liquid or solid at room temperature. They are first evaporated in an evaporator. Acid amides which are liquid at room temperature are supplied in general in undiluted form, while acid amides which are solid at room temperatures are preferably dissolved in an inert organic solvent and then introduced into the evaporator. Suitable solvents are, for example, aromatic or aliphatic hydrocarbons such as toluene, xylene, high boiling aliphatic hydrocarbon fractions, ethers, for example butylvinyl ether, esters, for example butyl acetate and the like.

As catalysts there can be used, above all "alkali metal metalates" i.e. compounds which are obtained in definite compositions when the more or less amphoteric hydroxides of suitable elements of any group of the Periodic System are combined with salt formation with alkali metal oxides or alkali metal hydroxides.

From among the great number of catalytically active alkali metal metalates there are mentioned by way of example alkali metal stannates such as sodium stannate and potassium stannate, alkali metal zincates, such as potassium zincate and lithium zincate, alkali metal aluminates such as potassium aluminate, alkali metal beryllates such as potassium beryllate, alkali metal vanadates such as potassium vanadate, alkali metal antimonates such as sodium antimonate, alkali metal titanates such as potassium titanate, alkali metal zirconates such as potassium zirconates, alkali metal molybdates such as potassium molybdate, alkali metal tungstates such as sodium tungstate, alkali metal manganites such as potassium manganite. Compounds of this kind can be prepared by methods described in literature.

The metalate catalysts are suitably supported on appropriate carriers.

The system catalyst/carrier can be prepared in various ways. Strongly amphoteric hydroxides are advantageously dissolved in aqueous alkali metal hydroxide solutions in a calculated molar proportion, granules or grains of the porous carrier material are impregnated with the metalate solution obtained and the solvent water is then eliminated under reduced pressure at about 100–120° C. The impregnated carrier material is then severely dried at a temperature above 250° C.

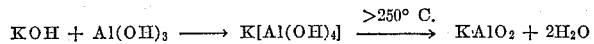

Hydroxides which are less amphoteric and dissolve in a multiple stoichiometric excess of alkali only are first transformed into the more readily soluble ammine complex compounds, the calculated amount of alkali metal hydroxide solution is added and with the complex salt solution obtained the carrier material is impregnated. When the impregnated carrier material is dried at about 300° C. ammonia and water are separated and the pure alkali metallate remains on the carrier material.

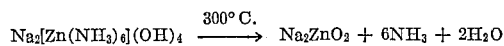

When still weaker amphoteric metal oxides or metal hydroxide solution is added and with the complex salt the metallate is to introduce the metal oxides or hydroxides into an appropriate alkali metal oxide or hydroxide melt

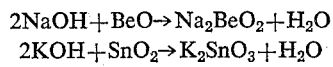

The melt is dissolved in water and the carrier material is impregnated with the solution obtained.

Some of the alkali metal metalates mentioned above are extremely sensitive to hydrolysis. In this case and when the metalate is insoluble in water the system carrier/catalyst is prepared in different manner:

The powdery metallates which have been very finely ground in mills, crushers or mixers, if necessary with the addition of an inert solvent, are mixed with the powdery carrier material, the mixture is made into a paste with a little water or a suitable organic diluent and from the paste granules, cylinders or tablets are compressed.

Alternatively, it is possible to prepare the metalates directly in the reaction furnace. An intimate mixture of the hydroxide or oxide of an amphoteric metal and the carrier material is made into a paste with the calculated amount of aqueous alkali metal hydroxide solution, the shaped structures made from the paste are predried under a protective gas for a short period of time and then heated in the furnace to the working temperature. However, the catalyst/carrier systems made in this manner are in general not so active as the systems prepared as described above.

Mixtures of alkali metal oxides and amphoteric or weakly amphoteric oxides of the metals of groups II to VIII of the Periodic System have also a good catalytic activity, for example the combinations alkali metal oxide/cadmium oxide (alkali metal "cadmate"), alkali metal oxide/lanthanum oxide (alkali metal "lanthanate"), alkali metal oxide/mercury oxide, alkali metal oxide/magnesium oxide, alkali metal oxide/iron oxide or alkali metal oxide/bismuth oxide. The action of these combinations may be attributed to a thermo-unstable metalate formation occurring at the high temperature applied on the surfaces of the oxide particles. The alkali metal oxide and the amphoteric oxide are suitably mixed in about equimolecular amounts.

The greater part of the aforesaid catalysts can be stored for an unlimited period of time and is insensitive to the most different influences.

In the reaction furnace the catalysts develop without pretreatment their full and long-lasting catalytic activity already after a short starting period.

The quantitative proportion of catalytically active substance to carrier material is advantageously 5:95 to 25:75 parts by weight, proportions outside this range being also applicable in special cases.

As carrier materials for the catalysts there can be used all known types of active carbon, such as A-carbon, charcoal from sugar, boneblack, charcoal from wood. Still further, there are suitable, above all in admixture with active carbon, pumice powder, silica gel, bleaching earths, for example kieselguhr, various types of clay and like porous materials, alumina, rutile, zirconium oxide, which are added in variable amounts. The selection of the carrier material also depends on whether the catalyst is used in a solid bed or in a fluidized bed.

Acetylene is catalytically reacted with lactams and acid amides in the presence of alkali metal metalate catalysts in the gaseous phase at elevated temperatures in the range of 200 to 500° C. and preferably 250 to 350° C.

The reaction is preferably carried out at atmospheric pressure. It is likewise possible to operate under a slight superatmospheric pressure provided that acetylene can be handled under the pressure applied without danger. When difficulty vaporizable acid amides or lactams are reacted it may be of advantage to operate under reduced pressure. The vinyl compound formed is suitably separated from the unreacted starting materials under reduced pressure.

The residence time of the reaction mixture in the reaction furnace is in most cases 10 to 50 seconds. It depends, however, on the reaction temperature applied and the type of catalyst. In some cases it may be of advantage to choose residence times which are shorter than 10 seconds or longer than 50 seconds.

Acetylene is used in pure form or diluted with inert carrier gases such as nitrogen or argon.

The process of the invention can be carried out in discontinuous manner but it is especially suitable for being carried out in continuous manner. The continuous process is particularly economic since the exhaust gas is reconducted into the reaction furnace after having been replenished with fresh gas and the unreacted acid amide or lactam from the sump of the rectifying column is recycled into the evaporator.

N-vinyl acid amides and N-vinyl lactams are valuable intermediate products for the manufacture of plastics, textile auxilaries and pharmaceutical products.

The following examples serve to illustrate the invention but they are not intended to limit it thereto.

Example 1

A contact tube having an inside diameter of 52 mm. and a length of 600 mm. was filled with 400 grams of active carbon granules (2 x 2 mm.) which had been impregnated with 29.4 grams (300 millimols) of potassium aluminate ($KAlO_2$) and the tube was given into a vertical, electrically heated reaction furnace. The tube was tightly connected by suitable conduits with an evaporator and a separator and cooling system. The heating of the furnace was adjusted in a manner such that the contact zone had a temperature in the range of 290 to 310° C. First nitrogen was conducted for some time through the apparatus and then acetylene was gradually added. The nitrogen current was slowly reduced in the same measure as the acetylene supply was increased until a mixing ratio of acetylene/nitrogen of 50/20 l./h. was adjusted. Into the evaporator 784 grams (=700 milliliters) of pyrrolidone-2 were introduced by means of a dosing pump at a rate such that about 40 grams thereof evaporated per hour and entered the reaction zone together with the acetylene. The catalyst was fully active after a short starting period. After one passage through the reaction zone from the condensate collected in the separator there could be obtained 331 grams of pure N-vinyl-pyrrolidone-2 having a boiling point of 90–92° C. under a pressure of 11 mm. of mercury and a refractive index $n_D^{20}$ of 1.5113 and over 500 grams of unreacted pyrrolidone-2. The conversion thus amounted to 32.4% and the yield was more than 95%.

Example 2

A steel tube having a diameter of 52 mm. and a length of 800 mm. was filled with small cylinders (3 x 5 mm.) which had been compressed from a mixture of 144 grams (588 millimols) of potassium stannate ($K_2SnO_3$), 377 grams of powdery active carbon and 94 grams of bleaching earth. After having connected the tube with evaporator, separator and cooling system the reaction zone was heated to 280–300° C. by external heating. The apparatus was purged with nitrogen and the nitrogen current was gradually replaced with acetylene. About 1.6 mols of pure acetylene passed per hour the reaction zone together with the vapors of 0.4 mol of pyrrolidone-2. The reaction was interrupted after a total throughput of 784 grams (9.2 mols) of pyrrolidone-2. The reaction products were separated by distillation. 493 grams of pure N-vinyl-pyrrolidone-2 having a boiling point of 93–96° C. under a pressure of 13–14 mm. of mercury and a solidification point of 13.7° C. and 366 grams of unreacted pyrrolidone-2 having a boiling point of 122–124° C. under a pressure of 10 mm. of mercury were obtained. The conversion of potassium stannate active carbon catalyst amounted to 48.1% and the yield was over 90%.

Example 3

A contact tube having a diameter of 52 mm. and a length of 600 mm. was filled with 400 grams of active carbon granules (2 x 2 mm.) as catalyst which had been impregnated with 96.5 grams (550 mmols) of potassium zincate ($K_2ZnO_2$). The contact tube was heated by an electric furnace at 300° C. After having purged with nitrogen for a prolonged period of time 50 l./h. of acetylene were introduced into the reaction zone through the evaporator connected at the upper part of the tube. Simultaneously, 35–40 cc./h. of a mixture of 475 grams of piperidone-2 and 250 cc. (217 grams) of toluene were fed to the evaporator. The reaction products accumulating in the separator were worked up by distillation. 330 grams of N-vinyl-piperidone-2 having a melting point of 42.5° C. and a boiling point of 109–111° C. (12 mm. of mercury), 200 grams of piperidone-2, and 200 grams of toluene were obtained. Thus in one passage 55% of the piperidone were converted on the potassium zincate-carbon catalyst into N-vinyl-piperidone.

Example 4

The contact zone having a capacity of 1150 cc. of the vinylation apparatus described in Examples 1–3 was filled with granules which had been compressed from a mixture of 62.5 grams (200 mmols) of potassium zirconate ($K_4ZrO_4$), 350 grams of powdery active carbon and 90 grams of bleaching earth. The reaction zone was heated from the outside to a temperature of 350–360° C. Nitrogen was passed through the apparatus. As soon as 28–31 grams per hour of N-methyl-acetamide were supplied to the evaporator the nitrogen was slowly replaced with acetylene. During the experiment the acetylene addition was adjusted to 30 l./h. The experiment was interrupted after 566 grams of N-methyl-acetamide had been put through. The distillation of the condensate yielded 46.8 grams of pure N-vinyl-N-methyl-acetamide having a boiling point of 64–66° C. under a pressure of 18–20 mm. of mercury. From the sump about 85% of the unreacted N-methyl-acetamide could be recovered. With one passage 6.1% of N-methyl-acetamide were transformed in a contact zone filled with potassium zirconate-carbon granules into N-vinyl-N-methyl-acetamide.

Example 5

The experiment was carried out as described in Example 1, with the exception that instead of the $KAlO_2$/carbon catalyst granules consisting of 93.7 grams (400 mmols) of potassium vanadate ($K_3VO_4$) and 400 grams of boneblack were used. The condensate was worked up and 409 grams of pure N-vinyl-pyrrolidone-2 and 410 grams of unreacted pyrrolidone were obtained, corresponding to a conversion of 40% and a yield of 92%.

Example 6

An evaporator was fed per hour with 40 cc. of a mixture of 750 grams of pyrrolidone-2 and 150 grams of toluene and simultaneously about 50 l./h. of pure acetylene were passed through the evaporation zone heated to 260–270° C. The gas/vapor mixture then entered the reaction zone having a temperature of 300° C., a length of 600 mm. and an inside diameter of 52 mm. The reaction zone was filled with granules (3 x 5 mm.) compressed from a mixture of 80.5 grams (300 mmols) of potassium titanate ($K_4TiO_4$), 350 grams of linden charcoal and 70 grams of $Al_2O_3$. The vapors leaving the reaction zone were condensed in separators and coolers. When all pyrrolidone had been passed through the condensate was worked up by distillation. 252 grams of N-vinyl-pyrrolidone-2, 145 grams of toluene and 480 grams of pyrrolidone-2 were obtained, corresponding to a conversion of 25.8%.

Examples 7–18

The activities of some further metallate and mixed oxide catalysts are recited in the following table. In all examples pyrrolidone-2 was used and the reaction was carried out under almost the same conditions as set forth in Examples 1–6.

| Example | Compound | Formula | Amount, mmols | Carrier Carbon, g. | Carrier Bleaching earth g. | Acetylene, l./h. | Reaction temperature | Conversion (one passage), percent |
|---|---|---|---|---|---|---|---|---|
| 7 | Potassium beryllate | $K_2BeO_2$ | 300 | 400 | | 50 | 290-310 | 21 |
| 8 | Sodium zincate | $Na_2ZnO_2$ | 300 | 400 | | 50 | 290-320 | 9.4 |
| 9 | Lithium zincate | $Li_2ZnO_2$ | 300 | 400 | | 50 | 290-320 | 3 |
| 10 | Potassium tungstate | $K_2WO_4$ | 300 | 400 | | 50 | 290-310 | 17.4 |
| 11 | Potassium molybdate | $K_2MoO_4$ | 300 | 400 | | 50 | 290-310 | 2.7 |
| 12 | Potassium lanthanum oxide | $K_2O.La_2O_3$ | 150 | 400 | | 50 | 290-310 | 15.4 |
| 13 | Potassium zirconate | $K_4ZrO_4$ | 200 | 350 | 70 | 50 | 290-310 | 33.3 |
| 14 | Potassium bismuth oxide | $K_2O.Bi_2O_3$ | 300 | 350 | 70 | 50 | 290-310 | 20 |
| 15 | Potassium zincate | $K_2ZnO_2$ | 650 | 400 | | 40 | 290-310 | 41.7 |
| 16 | Potassium iron oxide | $K_2O.Fe_2O_3$ | 300 | 350 | 70 | 50 | 290-310 | 5 |
| 17 | Potassium cadmium oxide | $K_2O.CdO$ | 300 | 350 | 70 | 50 | 290-310 | 39 |
| 18 | Potassium mercury oxide | $K_2O.HgO$ | 200 | 350 | 70 | 50 | 290-310 | 23 |

We claim:

1. A process for the manufacture of N-vinyl pyrrolidone which comprises reacting acetylene with pyrrolidone-2 in a reaction zone in the gaseous phase at an elevated temperature and in the presence of a catalyst selected from the group consisting of alkali metal stannates, alkali metal zincates, alkali metal aluminates, alkali metal beryllates, alkali metal vanadates, alkali metal antimonates, alkali metal titanates, alkali metal zirconates, alkali metal molybdates, alkali metal tungstates, alkali metal manganites, alkali metal lanthanum oxides, alkali metal bismuth oxides, alkali metal iron oxides, alkali metal cadmium oxides, and alkali metal mercury oxides.

2. A process as in claim 1 wherein the reaction is carried out at a temperature in the range of 250° to 350° C.

3. A process as in claim 1 wherein the reaction is carried out at atmospheric pressure.

4. A process as in claim 1 wherein said acetylene is used in admixture with an inert carrier gas.

5. A process as in claim 1 wherein the reaction is carried out in a continuous manner.

6. A process as in claim 1 wherein said catalyst is supported on a carrier.

7. A process as in claim 6 wherein said carrier-supported catalyst is prepared in said reaction zone.

8. A process as in claim 6 wherein said catalyst and carrier are mixed in a quantitative proportion of from 5:95 to 25:75.

9. A process for the manufacture of N-vinyl pyrrolidone which comprises mixing gaseous acetylene with liquid pyrrolidone-2, evaporating said pyrrolidone-2, conducting the gaseous and vaporous mixture into a reaction zone, heating the mixture for 10 to 50 seconds at 200° to 500° C. in the presence of a catalyst selected from the group consisting of alkali metal stannates, alkali metal zincates, alkali metal aluminates, alkali metal beryllates, alkali metal vanadates, alkali metal antimonates, alkali metal titanates, alkali metal zirconates, alkali metal molybdates, alkali metal tungstates, alkali metal manganites, alkali metal lanthanum oxides, alkali metal bismuth oxides, alkali metal iron oxides, alkali metal cadmium oxides, and alkali metal mercury oxides, and then separating said N-vinyl pyrrolidone from the reaction product by distillation.

10. A process as in claim 9 wherein the pyrrolidone-2 is dissolved in a solvent.

References Cited by the Examiner

UNITED STATES PATENTS

| | | | |
|---|---|---|---|
| 2,317,804 | 4/1943 | Reppe et al. | 260—239.3 |
| 2,669,570 | 2/1954 | Schnizer | 260—326.5 |
| 2,775,599 | 12/1956 | Puetzer et al. | 260—326.5 |
| 2,806,847 | 9/1957 | Nedwick | 260—239.3 |
| 2,806,848 | 9/1957 | Nedwick | 260—239.3 |

FOREIGN PATENTS

| | | |
|---|---|---|
| 799,924 | 8/1958 | Great Britain. |
| 846,575 | 8/1960 | Great Britain. |

OTHER REFERENCES

Abstract of Shostakovkiy et al., in Iz. An. SSSR, Otd. Khim. Nauk (1957) No. 12, pages 1457–1464 (USSR).

Reppe: "Acetylene Chemistry," pages 68–9 (Mayer and Co.) (1949).

Royals: "Advanced Organic Chemistry," pages 528–35 (Prentice-Hall) (1954).

WALTER A. MODANCE, *Primary Examiner.*

IRVING MARCUS, *Examiner.*